3,847,905
1,5-BENZODIAZEPINE DERIVATIVES
Oskar Bub, Ludwigshafen, Ludwig Friedrich, Mannheim, Hans-Peter Hofmann, Ludwigshafen, Horst Kreiskott, Wachenheim, and Frank Zimmermann, Mannheim, Germany, assignors to Knoll A.G. Chemische Fabriken, Ludwigshafen (Rhine), Germany
No Drawing. Filed Oct. 29, 1971, Ser. No. 193,972
Claims priority, application Germany, Oct. 28, 1970, P 20 52 840.9, P 20 52 841.0; July 2, 1971, P 21 33 065.4
Int. Cl. C07d 53/04
U.S. Cl. 260—239.3 B   6 Claims

ABSTRACT OF THE DISCLOSURE

A group of 1 - phenyl-2,3,4,5 - tetrahydro - 1H-1,5-chlorobenzodiazepine-2-one derivatives are disclosed in which the phenyl group may be unsubstituted or substituted by chloro and the 5-position is substituted by an acyl of 1 or 2 carbon atoms, an alkoxy carbonyl of 2 or 3 carbon atoms, an amino carbonyl, an alkyl aminocarbonyl of 2 or 3 carbon atoms, a dialkylamino carbonyl of 3 to 5 carbon atoms, a straight or branched alkyl of 2 or 3 carbon atoms which is substituted by a halogen atom, hydroxy, alkoxy or acyloxy of 1 to 3 carbon atoms, or a succinyloxy group. These compounds are orally administrable and exhibit strong anti-convulsive, sedative, tranquilizing and muscle-relaxing effects while having extremely low toxicity.

---

The present invention relates to new 1-phenyl-2,3,4,5-tetrahydro - 1H - 1,5 - benzodiazepine - 2 - one derivatives and a process for the preparation thereof.

The first known 1 - aryl - 2,3,4,5-tetrahydro - 1H-1,5 - benzodiazepine derivative was 3,3 - diethyl - 1-phenyl - 2,3,4,5 - tetrahydro - 1H - 1,5 benzodiazepine-2-one [B. J. R. Nicolaus et al., Helv. Chim. Acta, 48, 1867 (1965)]. Further 1 - aryl 2,3,4,5 - tetrahydro-1H-1,5 - benzodiazepines are disclosed in German Offenlegungsschrift No. 1,913,536. These have anticonvulsive, sedative and muscle-relaxing properties.

It has now been found that certain new 1 - phenyl-2,3,4,5 - tetrahydro - 1H - 1,5 - benzodiazepine - 2-ones have interesting pharmacological properties.

More specifically, the present invention relates to new 1 - phenyl - 2,3,4,5 - tetrahydro - 1H - 1,5-benzodiazepine-2-ones of the formula

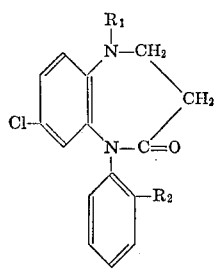

wherein $R_1$ represents an acyl of 1 or 2 carbon atoms, an alkoxy carbonyl of 2 or 3 carbon atoms, an amino carbonyl, an alkyl aminocarbonyl of 2 or 3 carbon atoms, a dialkylamino carbonyl of 3 to 5 carbon atoms, a straight or branched alkyl of 2 or 3 carbon atoms which is substituted by a halogen atom, hydroxy, alkoxy or acyloxy of 1 to 3 carbon atoms, or a succinyloxy group, and $R_2$ represents hydrogen or a chlorine atom.

The new compounds in which $R_1$ represents a formyl or acetyl group can be prepared by reacting 1 - phenyl-2,3,4,5 - tetrahydro - 1H - 1,5-benzodiazepine-2-ones of the formula

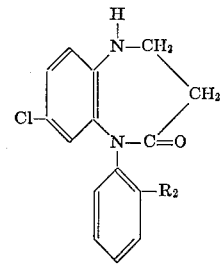

wherein $R_2$ has the above-mentioned significance, with formic or acetic acid, or with a suitable derivative of such an acid capable of reacting with said starting benzodiazepine.

The compounds in which $R_1$ is an alkoxycarbonyl of 2 or 3 carbon atoms, an aminocarbonyl, an alkylaminocarbonyl of 2 or 3 carbon atoms or a dialkylamino carbonyl of 3 to 5 carbon atoms, may be prepared by reacting said starting benzodiazepines with an acid, or a suitable derivative, especially an anhydride or halide, of an acid, of the formula R'COOH wherein R' represents a methoxy or ethoxy group, an amino group, an alkyl amino group of 1 or 2 carbon atoms or a dialkylamino group of 2 or 4 carbon atoms, or with phosgene and subsequently reacting with an alcohol, ammonia or an amine of the formula R"H wherein R" represents a methoxy or ethoxy group, an amino group, an alkylamino group containing 1 or 2 carbon atoms or a dialkylamino group containing 2 to 4 carbon atoms.

The reaction of the starting benzodiazepines with acids or acid anhydrides is preferably effected in the absence of solvents at comparatively high temperatures of the order of 50° to 140° C. If the reaction is effected with acid chlorides, it is preferably carried out in a solvent or solvents such as acetone or an ether in the presence of tertiary bases, for example dimethylaniline or triethylamine, the reaction temperature being in the range of about 20° to 30° C.

The starting benzodiazepines react with phosgene at room temperature. The reaction is preferably carried out in the presence of a solvent, for example chloroform. The resultant acid chlorides are then preferably reacted with ammonia, amines or alcohols in the presence of an agent which reacts with hydrogen chloride. For example, the reaction may be effected with excess amine or ammonia or in the present of a tertiary base.

Compounds in which $R_1$ is an aminocarbonyl group, may also be prepared by reacting the starting benzodiazepines with cyanic acid or with the salts thereof in acid solution. The reaction is preferably carried out with alkali cyanates in glacial acetic acid at temperatures in the range of about 20° to 30° C.

Compounds in which $R_1$ represents a straight or branched alkyl radical of 2 or 3 carbon atoms which is substituted by a halogen atom, a hydroxy group or an alkoxy or acyloxy group of 1 to 3 carbon atoms, can be obtained by reacting the starting benzodiazepines with compounds of the formula $R_1X$ wherein X represents a halogen atom or an aryl oxysulfonyl group.

This reaction may be effected either in the presence or in the absence of solvents and is usually carried out at a temperature in the range of 80° to 200° C. It is preferably carried out in the presence of an agent which reacts with hydrogen chloride. Non-alkylatable tertiary organic bases, such as tri-isopropanolamine are most suitable for this purpose.

Compounds in which $R_1$ signifies a hydroxyalkyl group of 2 to 3 carbon atoms can be prepared by the action of ethylene oxide or propylene oxide on the starting benzodiazepines.

Any free hydroxy groups contained in the compounds, if desired, may be esterified in the normal manner, e.g., by reacting them with acylating agents such as carboxylic acid anhydrides or chlorides. The reaction may be carried out with succinic anhydride in the presence of or absence of solvents and is usually carried out at a temperature in the range of 50° to 200° C. The process is preferably carried out in the presence of a tertiary base such as pyridine which simultaneoulsy acts as a solvent. Free hydroxy groups may also be replaced by a halogen atom by reaction with any one of several compounds such as thionyl or phosphoric halides.

The new compounds have valuable pharmacological properties. They exhibit strong anti-convulsive, sedative, tranquilizing and muscle-relaxing effects while having an extremely low toxicity, and are preferably administered orally, if desired in conjunction with a physiologically tolerable carrier. A representative number of the compounds have been tested for toxicity and efficacy with oral administration, and for comparison with meprobamate. The results are tabulated below and the test procedures are outlined immediately thereafter.

| Compound of Formula I | | I, mg./kg. | II A, mg./kg. | II B, mg./kg. | III A, mg./kg. | III B, minutes | IV A, mg./kg. | IV B, minutes | V, mg./kg. |
|---|---|---|---|---|---|---|---|---|---|
| $R_2$ | $R_1$ | | | | | | | | |
| H | —CHO | 1,500 | 8 | 20 | 40 | 120 | 150 | 30 | 10 |
| Cl | —CHO | >5,000 | 21 | 80 | 90 | 300 | 21 | 180 | >40 |
| Cl | —CO—$NH_2$ | >5,000 | 39 | 80 | 50 | 60 | 172 | 240 | 4.1 |
| H | —CO—O—$C_2H_5$ | >5,000 | 10.6 | 40 | 70 | 180 | 34 | 180 | 8.3 |
| H | —$CH_2$—$CH_2$—O—$CH_3$ | 1,250 | 3.8 | 20 | 16.5 | 120 | 8.8 | 120 | 1.8 |
| H | —$CH_2$—$CH_2$—OH | 990 | 3.4 | 20 | 6.9 | 120 | 14.8 | 240 | 8.0 |
| Cl | —$CH_2$—$CH_2$—OH | 1,170 | 2.0 | 10 | 25 | 120 | 23 | 180 | 9.5 |
| Cl | —$CH_2$—$CH_2$—O—$CH_3$ | 1,760 | 5.0 | 20 | 46 | 180 | 33 | 240 | 17 |
| H | —$CH_2$—$CH_2$—O—CO—$CH_3$ | 1,760 | 12.0 | 80 | 39 | 180 | 57 | 180 | ---- |
| H | —$CH_2$—$CH_2$—$CH_2$—OH | 3,760 | 10 | 80 | 39 | 120 | 51 | 180 | 9.5 |
| | Meprobamate | 900 | 75 | 200 | 110 | 60 | 150 | 30 | 55 |

In the table the vertical columns represent the following:

I: The toxicity, in terms of $LD_{50}$ within 24 hours, determined after a singe oral administration to mice (J. T. Litchfield and F. Wilcoxon, J. Pharmacol. Exp. Ther., 96, 99–113, 1949).

II: (A) Anti-conculsive effect against attacks of cramp induced in mice by means of pentetrazol (I. S. Goodman et al., J. Pharmacol. Exp. Ther., 108, 168–176, 1953). The effective dose ($ED_{50}$) of each compound tested is given as the dose at which half the animals are protected before the appearance of tonic cramps. (B) The dose at which no further animal dies after administration of pentetrazol (lethal protection does).

III: (A) Anti-conculsive effects measured by inhibiting electrically induced cramp attacks (maximum electric cramp) in mice (L. S. Goodman et al., Arch. Int. Pharmacodyn., 78, 144–162, 1949). The effective dose ($ED_{50}$) of each compound tested is given as dose at which half the animals are protected from tonic cramp attacks in their rear extremities. (B) The time, in minutes after administration, the $ED_{50}$ was determined.

IV: (A) Influence on the movement co-ordinates of mice investigated with reference to the rotating bar (F. Gross et al., Schweiz. Med. Wschr., 85, 305–309, 1955). The $ED_{50}$ represents the dose at which half the animals drop off the rotating bar within 30 seconds. (B) The time, in minutes after administration, the $ED_{50}$ was ascertained.

V: The tranquilizing effect, determined by influencing the defensive reaction of the golden hamster (H. Kreiskott, Medizin u. Chemie, 7, 57–78, 1963). The effective dose of each compound tested is given as ($ED_{50}$) the dose at which the number of responses to stimuli (back) at the time of maximum action on control animals is reduced to half.

The following examples are included to illustrate methods of preparation of the compounds of the invention.

EXAMPLE 1

8-chloro-1-(2'-chlorophenyl) 2,3,4,5-tetrahydro-1H-1,5-benzodiazepine-2-one (21.5 g.) and formic acid (50 ml.) were boiled under reflux for 2 hours. The reaction mixture was poured into water (500 ml.) with agitation. Crystalline 8 - chloro-1-(2'-chloro-phenyl)-5-formyl-2,3,4,5-tetrahydro-1H-1,5-benzodiazepine - 2 - one was filtered off, washed with water and recrystallized from isopropanol. A yield of 19.5 g. representing 84% of the theoretical yield having a melting point of 182°–183° C. was obtained.

In a similar manner, 8-chloro-5-formyl-1-phenyl-2,3,4,5-tetrahydro-1H-1,5-benzodiazepine-2-one was obtained.

A yield representing 89% of the theoretical yield having a melting point of 150°–151° C. when recrystallized from isopropanol was obtained.

EXAMPLE 2

8 - chloro - 1 - phenyl - 2,3,4,5 - tetrahydro - 1H - 1,5-benzodiazepine-2-one (35.5g.) was dissolved in acetone (500 ml.). After the addition of (N,N)-dimethylaniline (17.5 g.), acetyl chloride (11.5 g.) was added dropwise.

During the addition of the acetyl chloride, the mixture was stirred and cooled in ice water to maintain the temperature in the range of 20° to 30° C. After a short time, the reaction product began to crystallize out. Stirring was continued for 2 hours at room temperature and the mixture subsequently diluted with water (1 litre). After filtration and washing with water, the 5-acetyl-8-chloro-1-phenyl - 2,3,4,5 - tetrahydro-1H-1,5-benzodiazepine-2-one thus obtained is recrystallized from methanol.

A yield of 36 g. representing 88% of the theoretical yield having a melting point of 209°–210° C. was obtained.

5 - acetyl-8-chloro-1-(2'-chlorophenyl)-2,3,4,5-tetrahydro-1H-1,5-benzodiazepine-2-one is obtained in a similar manner.

In the latter case a yield of 85% of the theoretical yield having a melting point of 222°–223° C. when recrystallized from ethylmethylketone was obtained.

EXAMPLE 3

8 - chloro-1-(2'-chlorophenyl)-2,3,4,5-tetrahydro-1H-1,5-benzodiazepine-2-one (18.4 g.) was dissolved in acetone (150 ml.). After the addition of (N,N)-dimethylaniline (8 g.), chloroformic acid ethylester (8 g.) was added dropwise. The reaction mixture was stirred during the addition of the chloroformic acid ethylester and cooled, in ice water, to maintain the temperature within the range of 20°–30° C. Stirring was continued for 2 hours at room tempearture and thereafter the mixture was poured into water (500 ml.). The 8-chloro-1-(2'-chlorophenyl)-2,3,4, 5 - tetrahydro - 1H-1,5-benzodiazepine-2-one-5-carboxylic acid ethyl ester thus obtained in a crystalline form is filtered off, washed with water and recrystallized from isopropanol.

A yield of 17.5 g. representing 77% of the theoretical yield and having a melting point of 159°–160° C. was obtained.

8 - chloro - 1 - phenyl - 2,3,4,5 - tetrahydro 1H 1,5-benzodiazepine-2-one-5-carboxylic acid ethyl ester was obtained in a similar manner.

In this latter case, a yield of 84% of the theoretical yield having a melting point of 172°–173° C. when recrystallized from ethyl acetate was obtained.

EXAMPLE 4

8 - chloro - 1 -(2' - chlorophenyl) - 2,3,4,5 - tetrahydro-1H-1,5-benzodiazepine-2-one (21.5 g.) was dissolved in glacial acetic acid (200 ml.). A solution of sodium cyanate (8 g.) in water (50 ml.) was added dropwise, at room temperature and with stirring. After 1 hour, a further batch of sodium cyanate solution (8 g. sodium cyanate/50 ml. water) was added. After 2 hours, the reaction solution was poured into water (1 litre) and the 8-chloro-1 - (2' - chlorophenyl) - 2,3,4,5-tetrahydro-1H-1,5-benzodiazepine-2-one 5-carboxylic acid amide thus precipitated was recrystallized from ethanol.

A yield of 22.5 g. representing 92% of the theoretical yield having a melting point of 235°–236° C. was obtained. 8 - chloro-1-phenyl-2,3,4,5-tetrahydro-1H-1,5-benzodiazepine-2-one-5-carboxylic acid amide was obtained in a similar manner. In this latter case a yield of 85% of the theoretical yield having a melting point of 197°–198° C. when recrystallized from ethanol was obtained.

EXAMPLE 5

A solution of 8-chloro-1-phenyl-2,3,4,5-tetrahydro-1H-1,5-benzodiazepine-2-one (27 g.) was added to a solution of phosgene (15 g.) in chloroform (100 ml.) while stirring and cooling in ice water. Stirring was continued for 2 hours at room temperature and the solvent subsequently distilled off. The solid residue was mixed with a solution of diethylamine (15 g.) in benzene (200 ml.) and allowed to stand for 20 hours at room temperature. The mixture was separated off from the separated out diethylamine hydrochloride and the solvent distilled off. The crystalline residue of 8-chloro-1-phenyl-2,3,4,5-tetrahydro-1H - 1,5 - benzodiazepine-2-one-5-carboxylic acid diethyl amide was recrystallized from isopropanol. A yield of 25.5 g. representing 69% of the theoretical yield having a melting point of 171°–172° C. was obtained.

8 - chloro- 1 - (2' - chlorophenyl) - 2,3,4,5 - tetrahydro-1H - 1,5 - benzodiazepine-2-one-5-carboxylic acid methyl amide was obtained in a similar manner. In this latter case, a yield of 75% of the theoretical yield having a melting point of 223°–224° C. when recrystallized from alcohol was obtained.

EXAMPLE 6

8 - chloro - 1 - phenyl - 2,3,4,5 - tetrahydro - 1H - 1,5-benzodiazepine-2-one (28 g.), tri-isopropanolamine (21 g.) and 2-bromoethanol (14 g.) were heated slowly to 170° C. and maintained at this temperature under reflux for 2 hours. The still warm reaction mixture was poured into water and the 8-chloro-5-(β-hydroxyethyl)-1-phenyl-2,3,4,5-tetrahydro-1H-1,5-benzodiazepine-2-one thus precipitated was recrystallized from isopropanol. A yield of 26 g. representing 82% of the theoretical yield having a melting point of 160°–161° C. was obtained. 8-chloro-5-(β - hydroxyethyl) - 1 -(2' - chlorophenyl) - 2,3,4,5-tetrahydro - 1H-1,5-benzodiazepine-2-one was obtained in a similar manner. In this latter case a yield of 70% of the theoretical yield having a melting point of 148°–149° C. when recrystallized from ethyl acetate was obtained.

EXAMPLE 7

8 - chloro - 1 - phenyl - 2,3,4,5 - tetrahydro-1H-1,5-benzodiazepine - 2 - one (14 g.), tri-isopropanolamine (13.5 g.) and (2-bromoethyl) methyl ether (10 g.) were heated to 100° C. under reflux for 1 hour. The temperature was then slowly increased to 170° C. and the temperature maintained at this level for a further 2 hours. The still warm reaction mixture was poured into water and the precipitated product taken up in chloroform. After drying and evaporating off the chloroform solution, the crystalline residue is recrystallized from ethanol. 8-chloro - 5 - (β - methoxyethyl)-1-phenyl-2,3,4,5-tetrahydro - 1H - 1,5 - benzodiazepine-2-one (11 g.) was obtained. This represented 67% of the theoretical yield and had a melting point of 108°–109° C.

8 - chloro - 5 - (β - methoxyethyl) - 1 - (2'-chlorophenyl) - 2,3,4,5 - tetrahydro - 1H - 1,5 - benzodiazepine-2-one was also obtained in a similar manner.

In this case a yield of 58% of the theoretical yield having a melting point of 98° to 99° C. was obtained after recrystallization from isopropanol.

EXAMPLE 8

8 - chloro - 5 - (β - hydroxyethyl)-1-phenyl-2,3,4,5-tetrahydro - 1H - 1,5 - benzodiazepine (14 g.) was dissolved in pyridine (50 ml.). Acetic anhydride (6.5 g.) was then added, the mixture being cooled in iced water. After standing for 20 hours at room temperature, the reaction mixture was poured into water, acidified with dilute hydrochloric acid and extracted with chloroform. The washed and dried chloroform solution was evaporated and crystalline 8 - chloro - 5 - (β - acetoxyethyl)-1-phenyl-2,3,4,5-tetrahydro - 1H - 1,5 - benzodiazepine - 2 - one was obtained which was recrystallized from isopropanol. A yield of 16.5 g. representing 92% of the theoretical yield was obtained having a melting point of 118°–119° C.

EXAMPLE 9

A solution of 8 - chloro - 5 - (β - hydroxyethyl)-1-phenyl - 2,3,4,5 - tetrahydro - 1H - 1,5 - benzodiazepine-2-one (14 g.) in chloroform (50 ml.) was mixed with pyridine (6 ml.) and then with thionyl chloride (9 g.). The mixture was boiled under reflux for three hours. The chloroform solution was then washed with dilute hydrochloric acid and water, dried over sodium sulfate and evaporated. Crystalline 8 - chloro - 5 - (β - chloroethyl)-1 - phenyl - 2,3,4,5 - tetrahydro - 1H - 1,5 - benzodiazepine - 2 - one was obtained and was recrystallized from methylethyl ketone.

A yield of 13 g. representing 77% of the theoretical yield having a melting point of 180°–181°C. was obtained.

EXAMPLE 10

8 - chloro - 1 - phenyl - 2,3,4,5 - tetrahydro - 1H-1,5-benzodiazepine-2-one (14 g.) was heated with a solution of ethylene oxide (4.4 g.) in tetrahydrofuran (50 ml.). The reaction was effected in a 200 ml. autoclave for 24 hours to 150° C. After cooling, the contents of the autoclave were removed, the solvent was distilled off and the residue taken up in isopropanol (50 ml.). Unchanged starting material (43% of the theoretical amount) crystallized out. The mother liquor was then evaporated and the residue recrystallized from ethyl acetate. 3.5 g. of 8 - chloro - 5 - (β - hydroxyethyl) - 1 - phenyl-2,3,4,5-tetrahydro - 1H - 1,5 - benzodiazepine - 2 - one having a melting point of 160°–161° C. were obtained, which represents 22% of the theoretical yield.

EXAMPLE 11

8 - chloro - 1 - phenyl - 5 - (β-hydroxyethyl)-2,3,4,5-tetrahydro - 1H - 1,5 - benzodiazepine - 2 - one (16 g.) obtained as described in Example 6, and succinic anhydride (12 g.) were heated with pyridine (50 ml.) for 2 hours on a boiling water bath. After cooling, the mixture was poured into water (500 ml.). The clear solution was acidified with 5N hydrochloric acid, thereby causing the reaction product to precipitate in crystalline form. Extraction was effected, the mixture washed with water and the thus obtained 8 - chloro - 1 - phenyl - 5 - (β - succinyloxy-ethyl) - 2,3,4,5 - tetrahydro - 1H - 1,5 - benzodiazepine-2-one was recrystallized from isopropanol.

A yield of 18.5 g. representing 88% of the theoretical yield having a melting point of 146°–147° C. was obtained.

8 - chloro - 1 - (2' - chlorophenyl) - 5 - (β - succinyl-oxyethyl)-2,3,4,5 - tetrahydro - 1H - 1,5 - benzodiazepine-2-one was obtained in a similar manner in a yield representing 81% of the theoretical yield and having a melting point 149°–150° C. when recrystallized from ethyl acetate.

Similarly, 8 - chloro - 1 - phenyl - 5 - (γ - succinyloxy-propyl) - 2,3,4,5 - tetrahydro - 1H - 1,5 - benzodiazepine-2-one was obtained in a yield representing 86% of the theoretical yield and having a melting point of 141°–142° C. when recrystallized from isopropanol.

What we claim is:

1.

2.
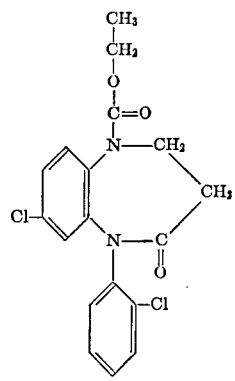

3.
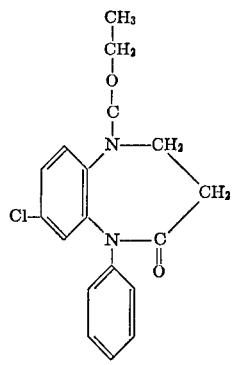

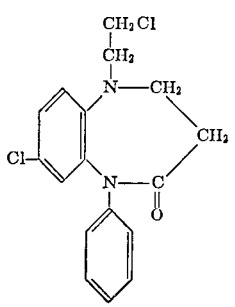

4.
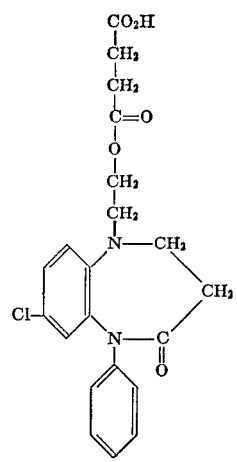

5.
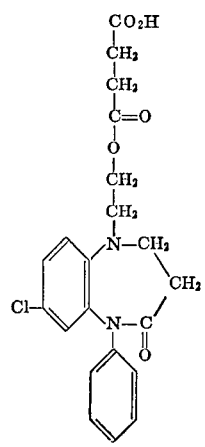

6.
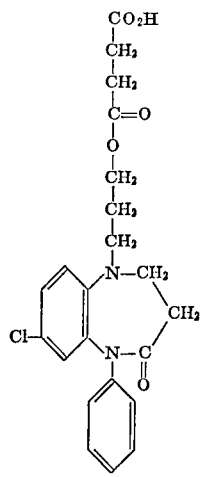

References Cited
UNITED STATES PATENTS
3,321,468   5/1967   Krapcho et al. ___ 260—239.3 B
FOREIGN PATENTS
1,913,536   10/1970   Germany _____ 260—239.3 B
751,384   12/1970   Belgium _____ 260—239.3 B JOHN D. RANDOLPH, Primary Examiner
R. T. BOND, Assistant Examiner U.S. Cl. X.R.
424—244